W. W. WALTON.
BRAKE ATTACHMENT FOR VEHICLES.
APPLICATION FILED DEC. 18, 1909.
964,345.
Patented July 12, 1910.
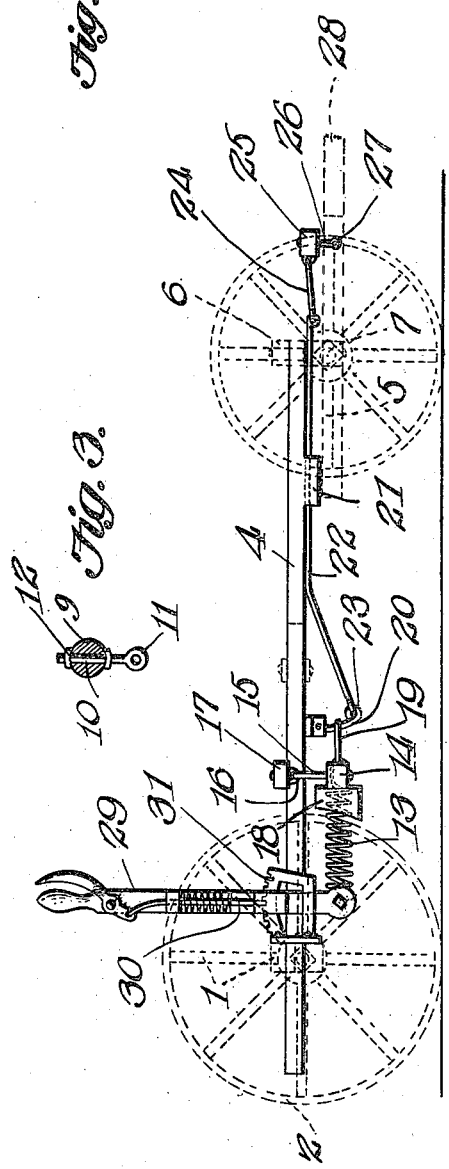
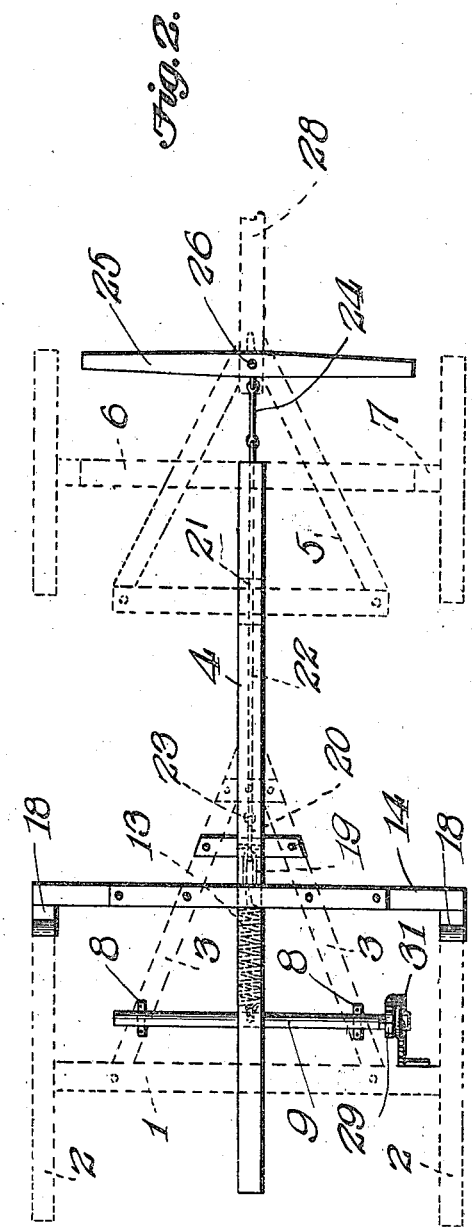
Inventor
William W. Walton
By Victor J. Evans
Attorney
Witnesses
Chas. C. Richardson
Wm. _____

UNITED STATES PATENT OFFICE.

WILLIAM W. WALTON, OF SANTIFEE, WEST VIRGINIA.

BRAKE ATTACHMENT FOR VEHICLES.

964,345.  Specification of Letters Patent.  Patented July 12, 1910.

Application filed December 18, 1909. Serial No. 533,937.

*To all whom it may concern:*

Be it known that I, WILLIAM W. WALTON, a citizen of the United States, residing at Santifee, in the county of Summers and State of West Virginia, have invented new and useful Improvements in Brake Attachments for Vehicles, of which the following is a specification.

This invention relates to an improved brake attachment for vehicles, and the primary object of the invention is to provide a device of this character which is extremely simple in construction, which can be attached to the running gear of any ordinary vehicle, and which provides means whereby the brakes may be applied with any desired amount of force.

With the above, and other objects in view, which will appear as the description progresses, the invention resides in the novel construction and combination of parts hereinafter fully described and claimed.

In the accompanying drawings there has been illustrated a simple and preferred embodiment of the improvement, and in which drawings, Figure 1 is a side elevation of the device constructed in accordance with the present invention, the vehicle being illustrated in dotted lines. Fig. 2 is a top plan view of the same. Fig. 3 is a detail sectional view taken through the shaft 9 and illustrating the connection of the eye-bolt 10 thereto.

In the accompanying drawings the numeral 1 designates the rear axle of the vehicle upon which are mounted the wheels 2. The axle 1 is provided with the usual bolster upon which is secured the rear hound 3. The numeral 4 designates the reach bar of the vehicle. This bar 4 is connected with the hound 5 attached to the bolster 6 of the front axle 7 of the vehicle.

Mounted in suitable bearings 8 upon the rear hound 3 is a transversely extending shaft 9, and this shaft is centrally provided with a suitable opening which is adapted for the reception of a threaded bolt member 10 having one of its ends provided with an eye 11. In order to effectively secure the bolt upon the shaft 9, I have provided the same with a pair of nuts 12, one of which bears upon the top of the shaft 9 and the other bears against the bottom of the said shaft. The eye 11 of the bolt 10 is adapted for the reception of a helical spring 13 and the said spring has its free end connected with a brake beam 14, the latter being connected through the medium of suitable links 15 with eyes 16 provided upon a cross bar 17. The brake beam 14 is provided with the usual brake shoes 18 which are adapted to lie in the path of the rear wheels 2 of the vehicle. The brake beam is centrally provided with a forwardly extending eye 19 and the said eye is adapted to engage a lever 20 pivotally connected with the reach bar 4. The reach bar has its under face provided with one or more bearings 21 which are adapted for the reception of a longitudinally extending rod 22, and the said rod is suitably inclined at its rear extremity so as to be brought into a line with an eye or offset 23 provided upon the link 20 and to which the said rod is connected. The forward end of the rod 22 is provided with a pivoted link 24 and the latter has its free extremity connected with a doubletree 25 of the vehicle. The doubletree 25 has its under face provided with a projecting member 26 having its extremity provided with an eye 27 which is adapted for the reception of a suitable pintle whereby the doubletree 25 is pivotally connected with the tongue 28 of the vehicle. By this arrangement it will be noted that the spring 13 has a tendency to force the brake shoes 18 into contact with the rear wheels 2 of the vehicle and it will be further noted that by providing the rod 22 with the link 24 the front wheels of the vehicle are free to turn without interfering with the said rod 22.

Rigidly connected with the shaft 9 is a lever 29, the same being provided with the usual spring pressed dog 30 and the same being adapted to engage between the teeth of a segment 31 which is securely connected with the bolster of the rear axle. By this arrangement, it will be noted that the tension of the spring 13 may be easily and quickly adjusted so as to tightly apply the brakes 18 to the wheels 2 or to loosen the same upon the said wheels if desired.

From the above description, taken in connection with the accompanying drawings, it will be noticed that I have provided an extremely simple and effective device for the purpose intended, and while I have illustrated and described the preferred embodiment of the improvement, as it now appears to me, minor details of construction, within the scope of the following claims, may be resorted to if desired.

Having thus fully described the invention, what I claim as new is:—

1. In combination with the running gear of a vehicle provided with the usual reach bar and hounds, of a brake for said vehicle, said brake comprising a beam swingingly connected with the reach bar, a shaft mounted in bearings upon the rear hound of the running gear, a bolt upon the shaft, a spring connecting the bolt and the brake beam, a lever provided with a spring pressed pawl connected with the shaft, a toothed segment upon the vehicle for the pawl, and a rod constructed of a pair of pivoted sections connected with the brake beam and with the doubletree of the vehicle.

2. In combination with the running gear of a vehicle provided with the usual reach bar and hounds, of a brake beam provided with brake shoes hingedly secured to the reach bar, a shaft mounted in bearings upon the rear hound of the running gear, a bolt connected with the shaft, a resilient member connecting the bolt and the brake beam, a lever provided with a spring pressed pawl connected with the shaft, a toothed segment for the pawl, an eye upon the brake beam, a pivoted link connected with the eye, a doubletree slidably connected with the running gear, and a rod comprising a pair of pivoted sections loosely connected with the link and with the doubletree.

In testimony whereof I affix my signature in presence of two witnesses.

WILLIAM W. WALTON.

Witnesses:
W. D. RHODES,
M. L. PYLES.